United States Patent [19]

Christiansen

[11] Patent Number: 4,541,464

[45] Date of Patent: Sep. 17, 1985

[54] VALVE DEVICE FOR THE PREVENTION OF THE OVERFILLING OF GAS CYLINDERS AND SIMILAR PORTABLE CONTAINERS

[75] Inventor: Ole Christiansen, Humlebaek, Denmark

[73] Assignee: Kosan Teknova A/S, Niva, Denmark

[21] Appl. No.: 538,052

[22] Filed: Sep. 30, 1983

[30] Foreign Application Priority Data

Oct. 15, 1982 [DK] Denmark .............................. 4592/82
Feb. 23, 1983 [DK] Denmark .............................. 802/83

[51] Int. Cl.[4] .......................... B65B 3/04; F16K 33/18
[52] U.S. Cl. ...................................... 141/198; 137/446
[58] Field of Search ................................ 141/192-229, 141/2, 18; 137/434, 446

[56] References Cited

U.S. PATENT DOCUMENTS

| | | | |
|---|---|---|---|
| 122,053 | 12/1871 | Peters | 137/446 |
| 2,289,868 | 7/1942 | Berck | 137/446 |
| 3,756,269 | 9/1973 | Brown | 137/446 |
| 4,064,907 | 12/1977 | Billington et al. | 137/446 |
| 4,142,552 | 3/1979 | Brown et al. | 137/446 |

FOREIGN PATENT DOCUMENTS

| | | | |
|---|---|---|---|
| 1142736 | 1/1963 | Fed. Rep. of Germany | 137/446 |

*Primary Examiner*—Houston S. Bell, Jr.
*Attorney, Agent, or Firm*—Anthony A. O'Brien

[57] ABSTRACT

The filling channel in the top piece of a liquid gas cylinder or a similar container to be filled only to a certain level determined by a float includes a closing valve which in the prescribed filling position of the container is raised from its seat by a pin on a universally journalled pivotal member which by a load is urged toward a given orientation in space. A tilting of the container causes the pivotal member to be rotated, thereby entailing a lateral displacement of the pin away from the closing valve which then occupies its closing position against the seat and prevents further filling until the container reoccupies the prescribed position.

When the maximum filling level has been reached, the float causes closing of the same valve, for instance by dominating the load so as to provoke a rotation of the pivotal member.

6 Claims, 3 Drawing Figures

Figure 1:
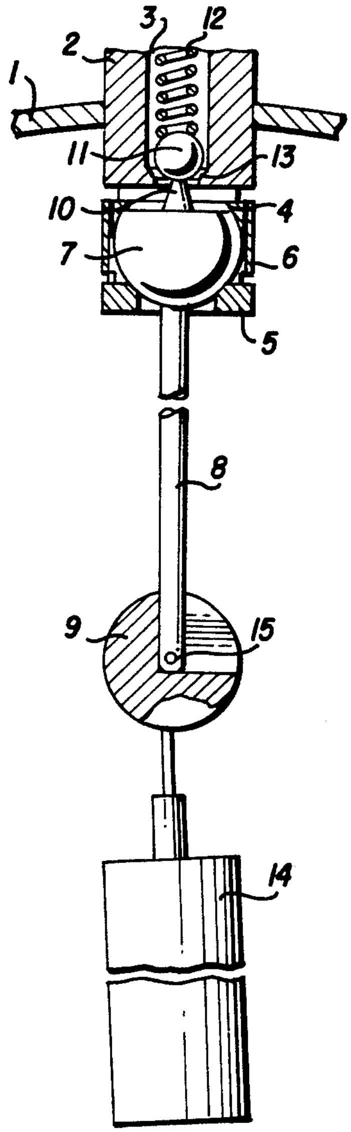

VALVE DEVICE FOR THE PREVENTION OF THE OVERFILLING OF GAS CYLINDERS AND SIMILAR PORTABLE CONTAINERS

When gas cylinders and similar portable containers are to be filled with liquid gas it must be ensured that the level of the liquid does not exceed a certain height, i.e. after the filling operation is finished an empty space should be left at the top of the container, usually about 20% of its total volume.

For this purpose it is known, as explained in the specifications of Danish patent application No. 2224/82 and U.S. application Nos. 493,214 and 493,215 to make use of a float-controlled valve to interrupt the filling by reaching the prescribed highest level, and it has also been stated in said specifications how said valve, intentionally or unintentionally, may be wholly or partially prevented from operating according to its purpose, viz. by holding the portable gas cylinder in a tilted or slanting position. However, the said specifications further disclose various possibilities of preventing overfilling, viz. by automatic interruption of the filling operation, if the gas cylinder is brought into such a position that the valve does not work as intended.

The present invention relates to a valve device of the same type and for the same general purpose. This valve too comprises a filling channel provided in a container top piece and forming, in the prescribed filling position of the container, communication from a connectable filling mouth piece to the container space, said communication being controlled by a universally pivotal member journalled in the top piece and which by a load is urged toward a given orientation in space so as to be rotated in relation to the top piece when the container is tilted away from the prescribed filling position, thereby causing an interruption of the communication, the device further comprising a float to stop the filling operation upon reaching the prescribed highest level in the container.

In the embodiments according to said patent applications the filling channel of the top piece communicates with a bore in a universally journalled member formed like a ball and the effect is caused by the fact that the bore by a certain tilting of the container away from the prescribed filling position comes out of alignment with the channel of the top so that this channel is cut-off by the ball surface close to the bore. Thus, it is a condition that fluid tightness be provided between the surface of the ball member and the corresponding spherical bearing surface in the top piece, and these elements must therefore be produced extremely precisely, as also the friction must be sufficiently low to allow the necessary free rotation of the ball.

The valve device according to the invention differs from the prior art embodiments in that the filling channel at its lower end comprises a seat for a valve member, which by the charging pressure of the fluid is urged toward this seat and during the normal filling operation is kept clear of the seat by means of the member directionally oriented by the force of gravity.

In this case the effective closing of the valve device requires fluid tightness only between the valve member and the associate seat, so that the universally journalled and directionally oriented member and its bearing shall meet only modest demands as relates tolerance. Moreover, it is a particular advantage that the fluid pressure gradient at said valve increases when the valve member is allowed to approach the seat, and said pressure gradient may therefore, appropriately together with a spring urging the valve member in the closing direction, effect a quick and reliable valve closing.

The valve lifting member may appropriately be a ball sector journalled in a spherical bearing in the top piece and provided with an upwardly projecting pin, the free end of which is located at least approximately in the spherical surface corresponding to the spherical bearing and has an area that is substantially smaller than the open area of the valve seat. Such a pin can easily be designed so as to result in a desired flow characteristic through the valve.

After the predetermined liquid level has been reached in the container while in its prescribed filling position, the filling operation may be interrupted by means of separate float-controlled valve, but a less complicated structure may be achieved when, according to the invention, the valve lifting member is controlled not only by the load but also by a float adapted to dominate, on obtaining the predetermined maximum filling level, the load so as to cause a pivoting of the member until it is clear of the valve member. In this case the function becomes double in the sense that the pin is pivoted from its valve lifting position, both when the container deviates from the prescribed filling position and when it has been filled to the allowable extent while in its correct position.

In a second embodiment of the valve device according to the invention the pin is constituted by the top end of a rod displaceable in a tube which connects the spherically journalled member with the load and at its lower end carries the float in a pivotal manner, said float being associated with a cam sector adapted to keep the rod and thus also the valve member raised till the prescribed maximum filling level has been attained. Also in this embodiment the valve is double-acting, but in such a manner, however, that the valve closing in the first case (in the inclined position of the container) is dependent on a rotation of the spherically journalled member and thus on a lateral movement of the pin away from the valve member, while in the other case the closing is caused by a downwardly directed displacement of the pin member and not by a rotation of the spherically journalled member against the gravity of its load. Thus, in this case the closing may be effected by a float of less buoyancy than that required in the previous embodiment. This is particularly important when smaller containers are concerned, such as ordinary liquid gas cylinders in which the float shall be inserted through the container opening in which the top piece has been secured by welding or through a threaded joint.

In another embodiment of the invention the valve lifting member is constituted by the upper end of a rod carrying the load and which close to said end is suspended on gimbals in the top piece. Such a bearing on gimbals is simpler and cheaper than a spherical bearing and may be practically non-frictional and insensitive to grains of sand and other dirt particles brought along with the flow of filling fluid.

The embodiments of the invention described in the foregoing are illustrated by axial sections in FIG. 1, FIG. 2 and FIG. 3 on the drawings and are explained more fully in the following.

FIG. 1 illustrates the upper portion 1 of a container, such as an ordinary liquid gas cylinder, having a top piece 2 containing an axial channel 3, through which the filling of the cylinder with liquid gas as well as the discharge of gas in gaseous state take place. The lower end of the top piece forms the upper portion 4 of a two-piece spherical bearing, the lower portion 5 of which is supported by the upper portion through a threaded collar 6. A substantially ball-shaped member 7 is freely rotatable in the bearing 4, 5 and is through a downwardly directed rod 8 connected with a load 9 aiming at keeping the member 7 in a given orientation in space irrespective of whether the container 1 is vertical or is tilted away from this normal filling and discharging position.

The ball member 7 is flattened at its top and is provided with an upwardly tapering pin 10 which in the illustrated position keeps a valve member 11 raised from an associated seat 13 at the lower end of the filling channel 3, said valve member being illustrated as a ball urged by a return spring 12. In an inclined position of the liquid gas cylinder 1, the upper end surface of the pin 10 which lies on the same spherical surface as the spherical face of the member 7, is laterally displaced away from the valve ball 11 so that said ball due to the combined effect of the force of gravity, the closing spring 12 and the charging fluid pressure firmly abuts the seat 13, thereby interrupting the filling.

The same will analogously occur when the liquid level in the gas cylinder 1 has reached the prescribed maximum level, but in this case the closing depends on the feature that the member 7 is forced to rotate in the bearing 4, 5 by means of a float 14 supported by the load 9 which is rotatable through a certain angle about a central bearing pin 15 at the lower end of the rod 8. When the liquid surface approaches the prescribed level, the float 14 and the weight 9 will be rotated about the pin 15 without thereby considerably changing the orientation of the member 7, but subsequent to maximum angle rotation, in the illustrated example about 90°, a continued rising level of liquid will entail a rotation of the member 7 in the bearing 4, 5 and consequently a closing of the ball valve 11, 13.

The float 14 could also be rotatable within certain limits on a load which is integral with the rod 8, for instance by partly gripping around such load with two or more curved fingers.

Figure 2:
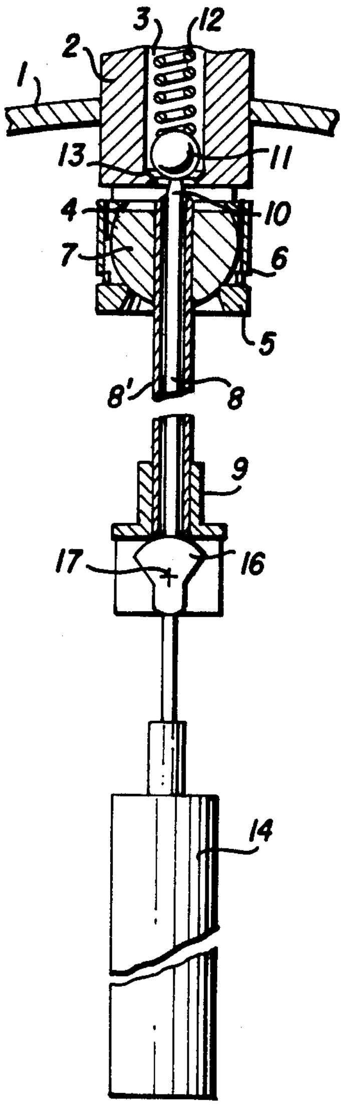

In FIG. 2 analogous parts have the same reference numerals as used in FIG. 1 and the most substantial difference is that the rod 8 is displaceable in a tube 8′ that connects the member 7 with the load 9 and that the pin 10 is formed by the upper end of said displaceable rod, the lowermost end of which is supported against a cam sector 16 journalled on a bearing pin 17 in the weight and rigidly connected with the float 14. At maximum level the closing of the valve 11, 13 in this case thus depends solely on a tilting of the float 14 and does not also depend on a rotation of the member 7 in its spherical bearing 4, 5.

Figure 3:
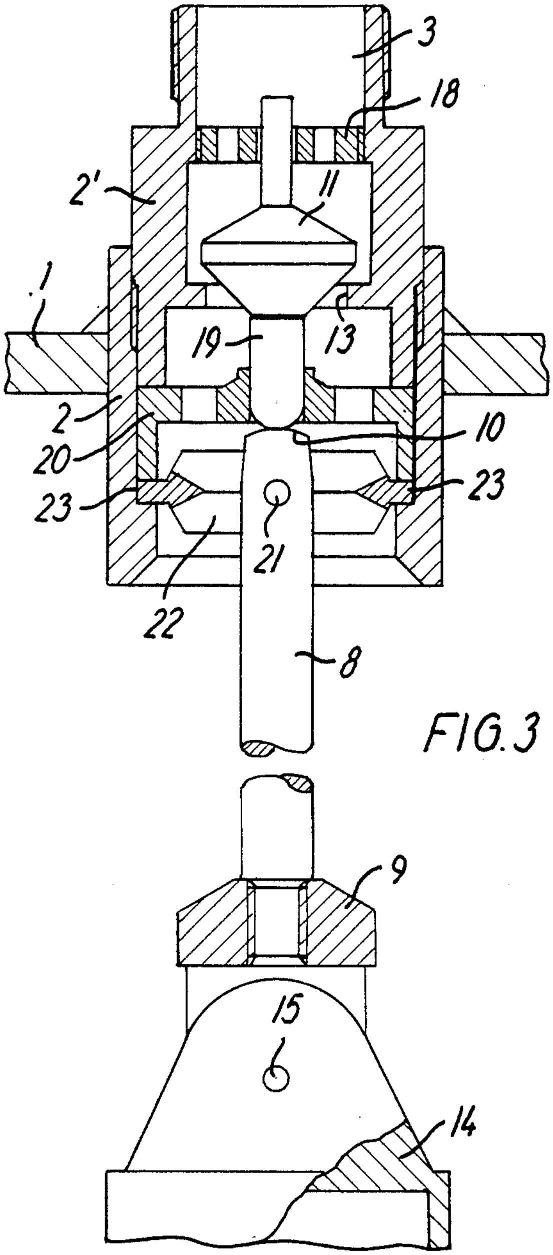

1 in FIG. 3 also indicates a portion of the top of a liquid gas cylinder with a top piece 2, for instance secured by welding. A nipple 2′ is screwed into said top piece and forms the upper portion of a filling and discharge passage 3 with a guide 18 for a valve member 11 loaded against a valve seat 13. This load is exerted by a fluid to be bottled and may be supplemented with a closing spring not shown. The valve member 11 is provided with a downwardly directed pin 19 which is displaceable in a further guide 20 and steps with its lower, rounded end on the likewise rounded, upper end portion 10 of a rod 8 which close to its top end is supported by a diametrical pin 21 in a ring 22 which is further journalled in the top piece 2 through a pair of pins 23 perpendicular to the pin 21. In this manner the top end of the rod 8 is suspended on gimbals and at the lower end the rod carries a load 9 so that the rod always aims at a vertical position.

In the correct filling position the container is also vertical as illustrated in the drawing and the end portion 10 of the rod 8 acts as a valve lifter that keeps the passage 3 open. By a certain deviation of the rod in relation to the container as a consequence of a tilting thereof, the top of the end portion 10 is displaced laterally in relation to the downwardly directed pin 19 of the valve member and dependent on the magnitude of the deviation and the dimensions, including the curvature of the end surface of the portion 10, a container tilting of about 15° to 20° may cause complete closing of the passage 3.

Through a hinge pin 15 the load 9 supports a float 14 which till a certain filling level has been reached, contributes to keep the rod 8 vertical. When, however, the filling level in the container approaches the prescribed maximum height the buoyancy of the float 14 will cause a tilting about the pin 15. Within an angle of appropriate magnitude, this tilting is without influence on the load 9 but a further tilting of the float 14 relative to the load 9 will be impeded, and as the liquid level rises further in the container the buoyancy of the float 14 will dominate the load 9 and cause the rod 8 to swing on the pin 21, thereby closing the valve 11 against the seat 13.

An arrangement with a tube suspended on gimbals etc. as shown in FIG. 2 is also practicable.

I claim:

1. A valve device for the prevention of overfilling of gas cylinders and similar portable containers, comprising

- a filling channel provided in a container top piece and forming, in the prescribed filling position of the container, communication from a connectable filling mouth piece to the container space,
- a universally pivotal member journalled in the top piece and operative to control said communication,
- a load urging said pivotal member toward a given orientation in space so as to rotate in relation to the top piece when the container is tilted away from the prescribed filling position, thereby causing an interruption of the communication,
- a float to stop the filling operation upon reaching the prescribed, highest level in the container,
- a valve seat located at the lower end of said filling channel,
- a valve member which by the charging pressure is urged toward said seat and during the normal filling operation is kept clear of the seat by means of said pivotal member directionally oriented by said load.

2. A valve device as claimed in claim 1, wherein the valve lifting pivotal member is a ball sector journalled in a spherical bearing in the top piece and provided with an upwardly directed pin, the free end of which is located at least approximately in the spherical surface corresponding to the spherical bearing and has an area that is substantially smaller than the open area of said valve seat.

3. A valve device as claimed in claim 1, wherein the valve lifting pivotal member is operatively associated with said float in such a way that on obtaining the predetermined maximum filling level the float dominates said load so as to cause a pivoting of said pivotal member until it is clear of said valve member.

4. A valve device as claimed in claim 3, wherein said valve lifting pivotal member is secured to the upper end of a rod which at its lower end supports said load, said float being pivotally connected with the lower end of said rod.

5. A valve device as claimed in claim 2, wherein said pin is constituted by the top end of a rod displaceable in a tube which connects said pivotal member with said load and at its lower end carries said float in a pivotal manner, said float being associated with a cam sector adapted to keep said rod and thus also the valve member raised till the prescribed maximum filling level has been attained.

6. A valve device as claimed in claim 1, wherein the valve lifting pivotal member is constituted by the upper end of a rod carrying said load and which close to said end is suspended on gimbals in the top piece.

* * * * *